United States Patent Office 3,420,510
Patented Jan. 7, 1969

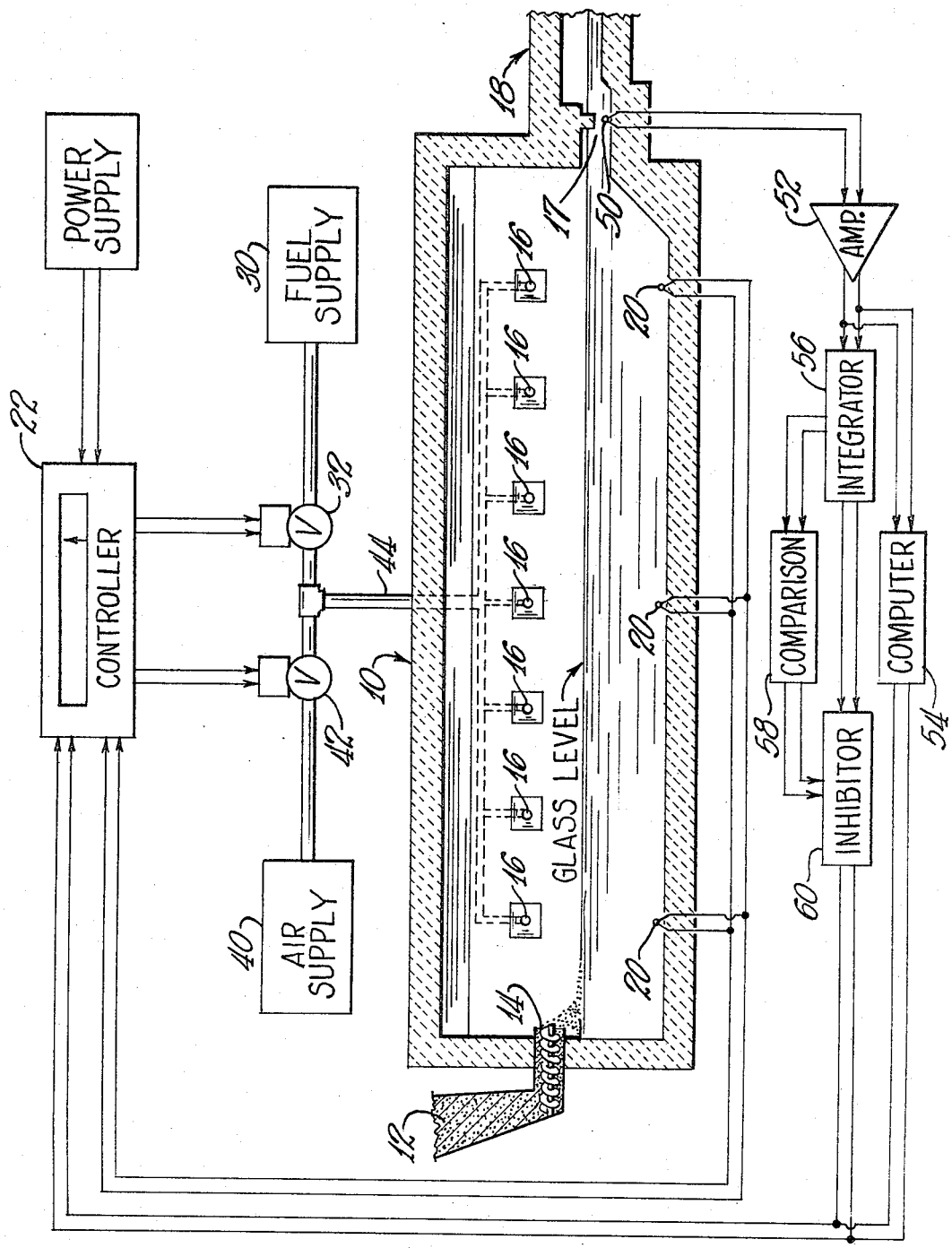

3,420,510
METHOD OF AND APPARATUS FOR HEATING MATERIAL
Paul D. Griem, Jr., Newark, Ohio, assignor to Owens-Corning Fiberglas Corporation, a corporation of Delaware
Filed Mar. 31, 1967, Ser. No. 627,406
U.S. Cl. 263—11                                     20 Claims
Int. Cl. C03b 5/24

ABSTRACT OF THE DISCLOSURE

Shutdown and startup of molten glass output from a forehearth section of a glass processing furnace is indicated by a gradual change in temperature sensed by a thermocouple located either in the exit throat of a melting tank or in the forehearth. This change is sensed and a signal derived therefrom to modify the control for the burners located in the melting tank during a startup or shutdown.

---

This invention relates to a method of and apparatus for heating material in general and may be applied particularly to a method of and apparatus for processing heat-softenable materials including glass or other mineral material utilized in forming or producing fibers by a suitable fiber attenuating means.

Although this invention is applicable in other areas it will be described in detail with respect to its use in the glass processing and fiber forming areas. It has been a practice to melt glass batch or cullet in a furnace and flow the molten material into a forehearth in order to supply glass in flowable condition to one or more feeders associated with the forehearth. The feeders are formed with a plurality of small openings or orifices through which streams of glass flow, as supplied by the forehearth, providing glass bodies which may be readily attenuated into fibers. The streams or glass bodies may be attenuated into fibers by various means such as by engaging hot gaseous blasts moving at high velocities with primary filaments formed from the streams or engaging the streams directly with blasts of steam or compressed air. Further, filaments or fibers may be formed through the spinner or centrifugal process. If continuous filaments or fibers are desired, the streams may be attenuated by directing the filaments into contact with rapidly rotating pull or nip rolls or the filaments or strand of filaments may be rapidly wound upon a cylindrical sleeve or mandrel into package form, the winding of the strand at high speed providing the force for attenuating or drawing the streams into filaments.

The uniformity and quality of fibers or filaments attenuated from the glass streams or primary filaments formed therefrom are, in large measure, dependent upon the homogenous character of the glass composition wherein the constituents are uniformly distributed and upon the proper control of temperature and viscosity characteristics of the glass adjacent each feeder associated with the forehearth. Arrangements of furnace and forehearth heretofore employed have certain disadvantages which have presented difficulties in maintaining satisfactory control of the homogeneity of the glass composition, viscosity and temperature characteristics in the production of filaments or fibers from several feeders disposed along the forehearth.

In the event that a feeder connected to a conventional furnace-forehearth arrangement becomes defective or fails to function, or it is desired to clean or perform some other maintenance upon a feeder, the feeder must be removed from production. Therefore, the glass flow from the furnace to the forehearth is suddenly reduced by that percentage which the closed down feeder or feeders represents of the total number of feeders associated with the forehearth. Obviously, the extreme case is when all of the feeders are shut down or if only one feeder is associated with the forehearth, it is shut down. In these latter instances the glass flow from the furnace to the forehearth will stop immediately, since the hydraulic connection between the feeder-forehearth-furnace arrangement is direct. Therefore, even though the heating of the melt in the furnace is directly responsive to a means for sensing the temperature of the molten glass in the furnace, the response time of this control is sufficiently long so that an upset in control will occur and the glass melt in the furnace and the entire thermal environment of the furnace will become overheated before the control means can respond.

This is disadvantageous for several reasons. If the batch being melted is desired to be melted but only heated to a certain temperature to preserve certain desired characteristics, then the overheat or upset condition may prevent the maintenance of the desired condition of the glass melt in the furnace. Even if the rise in temperature will not modify the characteristics of the glass melt in the furnace the operation or production must be suspended for a time after the feeder or feeders is put back into operation to allow the furnace to return to a temperature to provide a glass melt flowing from the exit or outlet of the furnace to be in a temperature range which is controllable by the normal heating procedures in the forehearth and/or feeder.

Conversely, whenever a start-up of production of one or more feeders associated with the forehearth occurs the opposite upset occurs in that the furnace cannot bring the glass melt in the furnace to the proper temperature within the desired time because of a slow response time.

Accordingly, it is an object of this invention to provide an improved method of and apparatus for heat treating material.

It is another object of this invention to provide improved glass melting and processing apparatus which includes control means operative to anticipate future requirements from the melting tank and controls the heat supplied to the tank accordingly.

It is a further object of this invention to provide improved glass melting and processing apparatus which may maintain more adequate and accurate control of the viscosity and temperature characteristics of the material during processing operations.

Still another object of the invention is the provision of control means for a furnace and forehearth of a character rendering it possible to repair a portion or portions of the forehearth or feeder without upsetting the control process within the furnace proper.

A further object of this invention is to provide a method of controlling a furnace which anticipates the future requirements of the furnace and controls the heat therein accordingly.

To carry out the above objects the invention features apparatus for heat treating material which comprises a tank having a material inlet means and a material exit means. Heating means are adapted to heat the interior of the tank or a zone thereof and the material fed thereto through the inlet. Control means responsive to the temperature of the material in the tank regulates the amount of heat supplied to the tank or to the zone by the heating means. Means responsive to the temperature of the material in the exit of the tank or the zone modifies the regulating effect of the control means. The tank may be a melting tank adapted to receive solid batch material at the inlet means and provide molten material at the exit means. The heating means may comprise burner means with the control means regulating the flow of fuel to the burner means. The control means may include means for sensing the temperature of the molten material in the tank and means responsive to the tank material temperature sensing means for regulating the flow of fuel to the burner means. The modifying means may include means for sensing the temperature of molten material in the exit means and means responsive to the exit temperature sensing means for providing a modifying signal to the fuel flow regulating means.

In specific control operations the exit temperature sensing means may provide a modifying signal operative to cut back fuel flow in response to a temperature drop in the molten material in the exit means. The exit temperature sensing means may also provide a modifying signal operative to increase fuel flow in response to a temperature increase in the molten material in the exit means. Further control refinements may include means for measuring the rate of change of the temperature of the molten material in the exit means and means responsive to the rate of change measuring means for inhibiting the transmission of the modifying signal until a predetermined rate of change is reached. A further refinement may include means for measuring the amount of change of temperature of the molten material in the exit means and means responsive to the amount measuring means for inhibiting the transmission of the modifying signal until a predetermined level of change is reached.

The invention features a method of controlling a furnace which comprises the steps of supplying material through an inlet of a furnace, heating the material to a molten state in the furnace, flowing the molten material through an exit means of the furnace, sensing the temperature of the molten material in the furnace, regulating the heat supplied in the furnace in response to the sensed temperature of the molten material in the furnace, sensing the temperature of the molten material in the exit means, and modifying the effect of the furnace material temperature on the regulation of heat in response to temperature changes sensed in the exit means. The modifying step may include the step of attempting to increase the heat supplied to the furnace in response to an increasing temperature of the molten material in the exit means. The modifying step may also include the step of attempting to decrease the heat supplied to the furnace in response to a decreasing temperature of the molten material in the exit means. The method may include the further step of inhibiting the modifying step unless the rate of change of the temperature of the molten material in the exit means falls within predetermined limits.

Other objects, features, and advantages will become apparent when the following description is taken in conjunction with the accompanying drawing, in which, a semidiagrammatic view illustrating one form of the teachings of this invention is shown.

As the method and apparatus of the invention have particular utility with a furnace or equipment utilized for melting glass or other heat-softenable mineral material to utilize the glass or similar material for forming fibers or filaments, a melting furnace of this character is illustrated in conjunction with the apparatus. There is illustrated a melting furnace or tank 10 constructed of refractory material which is adapted to receive glass batch or cullet 12 through a material receiving section or inlet 14. The furnace 10 may be fired by a plurality of fuel gas or oil burners 16 to a temperature rendering the glass batch or cullet molten and flowable. As indicated in the drawing the raw batch material or cullet is introduced at the rear end of an elongated furnace 10, the material in molten condition flowing forwardly or generally lengthwise of the furnace, and is mixed and fined as it flows through the furnace to and through a forehearth 18.

The glass or other molten material in the forehearth 18 may be delivered from the forehearth in any desired manner, depending upon the method of processing, to one or more feeders (not shown), each provided with a plurality of openings or orifices for flowing glass streams adapted to form primary filaments of bodies which are adapted to be delivered or fed to an attenuating means. A temperature sensing means such as a thermocouple 20 is provided to sense the temperature of the molten material in the tank 10. A signal proportional to a temperature sensed by the thermocouple 20 is supplied to the controller 22. The burner means 16 are supplied fuel from a fuel supply 30 via a control valve 32. Combustion air from an air supply 40, which is usually passed through a recuperator where it is heated, is supplied through control valve 42 to be mixed in supply conduit 44.

The controller 22 may be of any suitable type well known in the prior art which is operative to control valves 32 and 42 to supply fuel and combustion air to burners 16 in an amount necessary to melt glass batch and maintain the molten glass at a temperature determined by the selected set point of the controller. The rate at which combustion air is delivered to the burner 16 may be controlled by valve 42 or a damper which is regulated by the controller 22. Similarly, the controller regulates the flow of fuel from supply 30 through valve 32. The controller 22 may open or close valve 42 in response to decreases or increases, respectively, in the temperature as indicated by thermocouple means 20 in the glass melt and may proportion the rate of flow of gas or other fuel from supply 30 to the rate of air flow. Alternatively, the controller 22 may open or close valve 32 in response to decreases or increases, respectively, in the temperature as indicated by thermocouple 20 and proportion the rate of flow of combustion air through valve or flow regulating means 42 in proportion to the fuel flow through valve 32.

As was discussed hereinbefore, the control means just described has a relatively slow response time in that the thermal environment of the molten glass and insulating refractory material is sufficient to slow the response of the control means as driven by signals from thermocouple 20, so that the control may overshoot considerably in either direction in the event of a sudden slow down or speed up of molten material delivered from the melting tank 10 to the forehearth 18. To remedy this situation a temperature sensing means such as a thermocouple 50 is placed in the throat, outlet or exit 17 of the furnace 10 where it connects with forehearth 18. The temperature of the molten glass in this area because of a reduced total thermal environment responds more quickly to temperature changes caused by a change in flow from the melting tank 10 to the forehearth 18 and the feeders associated therewith. Accordingly, the temperature sensed by the thermocouple means 50 provides a signal which may be amplified by amplifier 52 and fed to the controller 22 to modify the regulating effect of the signals received from the tank melt thermocouple 20.

As an alternative, for an even quicker response, the sensing thermocouple 50 may be located in the forehearth directly above where the forehearth discharges molten glass to a bushing. In this position, even more remote from the melting tank than the throat position shown in the drawing, the total thermal environment may be even more reduced. In either embodiment the temperature of the molten glass flow after it leaves the melting tank is sensed to modify the control exercised by thermocouples 20. That is, the thermocouple 50 senses the temperature of the molten glass in the outlet means which includes the throat location and/or the forehearth location of the thermocouple 50.

When the output is shut off or slowed down to the forehearth the flow of new hot glass through the throat outlet 17 is correspondingly shut off or reduced. The underglass temperature as sensed by the throat thermocouple 50, therefore, gradually reduces. The reduction in temperature of molten glass would normally indicate that an increase in temperature is necessary in the melting section. However, a decrease in temperature of the glass in the throat section indicates by its rate of reduction that the change is not a result of insufficient firing in the melter, but rather is caused by a shut down or a reduction of output from the forehearth. Therefore, the signal provided by the temperature sensing means 50 is utilized to modify via the controller 22 the firing of the tank by cutting back or reducing the rate of flow of fuel before the temperature in the melting section has a chance to rise to upset proportions.

In one embodiment the throat temperature from thermocouple 50 may be measured every two seconds by a computer 54. At a shutdown of output, a drop of temperature in the tank throat 17 at a rate in the order of 40° in four readings taken over a period of 6 seconds indicates the output has been cut off. This rate of change in the under-glass temperature at the throat 17 thus is used to tell the tank melting zone to reduce firing to maintain the temperature relatively constant.

Conversely, upon the start-up of output from the forehearth 18, the throat temperature as measured by thermocouple 50 will be effected by the flow of fresh high temperature glass. Again a rate of change may be measured by the computer 54 and utilized to tell the tank to fire up again to effect melt down of batch at a rate corresponding to normal production.

As an alternative to the use of built-in circuits of a computer an integrator 56 may be utilized to detect rate of change or to act as a build-up or summing device. The rate of change or the sum of the amount of change as measured by the integrator 56 may be compared with a predetermined rate of change or sum or amount set in comparison circuit 58. The comparison circuit 58 may be connected to an inhibitor circuit 60 which will inhibit the transmission of a modifying signal to the controller 22 unless the sum or total amount or unless the rate of temperature change is equal to or within a predetermined tolerance of a predetermined sum or amount or predetermined rate of change programmed in the comparison circuit.

Thus both the computer 54 and the integrator-comparison-inhibitor circuit arrangement may be utilized to discriminate between cooling caused by shut down of or reduction of output and temperature reductions effected by relatively cool masses or islands of incompletely melted material passing through the throat. A modifying signal will be transmitted to the controller in response only to those rates of change or total amounts of change corresponding to shut down and start up and/or predetermined reductions in output from the forehearth 18. Any rapid or relatively short time changes effected by incompletely melted material accidentally entering the throat, outlet or exit section 17 may be allowed to pass without modifying the action of the controller 22 in response to thermocouple 20. For example, if the temperature change is more than 40° in a time less than 6 seconds the computer section 54 may be programmed to not forward a modifying signal to the controller 22. The modification of normal control thus may be made selectively responsive to predetermined rates of changes in temperature or total amouns of change in temperature as sensed by the circuitry illustrated.

The control arrangement herein provides considerable savings in production time since it allows speed up of the time required to return to production after a shut down of output from a feeder for operations such as hood cleanouts. The cleaning of the hood on some production lines occur three times a day. The control arrangement illustrated herein enables two hours more of production time per day because of the speed up after hood cleaning. Further, the control arrangement herein enables the maintenance of more rapid and accurate control of the viscosity and temperature characteristics of the molten material during the processing operation.

It is to be noted that while the feed forward control has been illustrated herein as operable with a glass melting furnace that such controls are also operable with other heat treating methods and apparatus. For example, the controls could be uilized to effect a more even heating and curing of mats having a binder therein which are being cured in an oven as they are conveyed therethrough. The flow of the mat or mats through the oven may be utilized to provide a signal similar to that provided by the throat control thermocouple 50 in the drawing to modify the heat and/or drying air supplied to the mat in the oven.

It is apparent that, within the scope of the invention, modifications and different arrangements may be made other than is herein disclosed as well as varying applications for the invention, and the present disclosure is illustrative merely, the invention comprehending all variations thereof.

I claim:

1. Apparatus for heating material comprising a heating zone having material inlet means and material exit means, heating means adapted to heat said heating zone and said material fed thereto through said inlet means, control means responsive to the temperature of the material in said zone for regulating the amount of heat supplied to said material in said zone by said heating means, and means responsive to the temperature of said material exiting from said zone for modifying the regulating effect of said control means and thus modifying the amount of heat supplied to material still in said zone.

2. Apparatus as defined in claim 1 in which said heating zone and said heating means are parts of a melting tank adapted to receive solid batch material at said inlet means and provide molten material at said exit means.

3. Apparatus as defined in claim 2 in which said heating means comprises burner means and in which said control means regulates flow of fuel to said burner means.

4. Apparatus as defined in claim 3 in which said control means includes means for sensing the temperature of molten material in said tank and means responsive to said tank material temperature sensing means for regulating flow of fuel to said burner means.

5. Apparatus as defined in claim 4 in which said modifying means includes means for sensing the temperature of molten material in said exit means and means responsive to said exit temperature sensing means for providing a modifying signal to said fuel flow regulating means.

6. Apparatus as defined in claim 5 in which said exit temperature sensing means provides a modifying signal operative to cut back fuel flow in response to a temperature drop in said molten material in said exit means.

7. Apparatus as defined in claim 5 in which said exit temperature sensing means provides a modifying signal operative to increase fuel flow in response to a temperature increase in said molten material in said exit means.

8. Apparatus as defined in claim 5 which further includes means for measuring the rate of change of the temperature of said molten material in said exit means and means responsive to said rate of change measuring means for inhibiting the transmission of said modifying signal until a predetermined rate of change is reached.

9. Apparatus as defined in claim 5 which further includes means for measuring the amount of change of said temperature of said molten material in said exit means and means responsive to said amount measuring means for inhibiting the transmission of said modifying signal until a predetermined level of change is reached.

10. Glass melting and processing apparatus comprising a melting tank having a batch inlet means and a molten glass outlet means, burner means adapted to melt batch fed into said inlet means, control means for regulating fuel flow to said burner means in response to the temperature of said melt in said tank, and means responsive to the temperature of said molten glass exiting from said outlet means for modifying the control of said fuel flow regulating means and thus modifying the amount of heat supplied to glass still in said tank.

11. Apparatus as defined in claim 10 in which said modifying means includes means for sening the temperature of said molten glass in said outlet and providing a modifying signal proportional to changes in temperature thereof to said fuel flow regulating means.

12. Apparatus as defined in claim 11 in which said modifying means provides a modifying signal operative to attempt to increase fuel flow in response to temperature increases of said molten glass in said outlet means.

13. Apparatus as defined in claim 11 in which said modifying means provides a modifying signal operative to attempt to decrease fuel flow in response to temperature decreases of said molten glass in said outlet means.

14. Apparatus as defined in claim 11 which further includes means for measuring the rate of change of the temperature of said molten material in said outlet means and means responsive to said rate of change measuring means for inhibiting the transmission of said modifying signal unless said measured rate of change is within a predetermined tolerance of a predetermined rate of change.

15. A method of controlling a furnace comprising the steps of supplying material through an inlet of a furnace, heating said material to a molten state in said furnace, flowing said molten material through an outlet means of said furnace, sensing the temperature of said molten material in said furnace, regulating the heat supplied to said material in said furnace in response to the sensed temperature of said molten material in said furnace, sensing the temperature of said molten material exiting from said outlet means, and modifying the effect of said furnace material temperature on the regulation of heat in response to temperature changes sensed in said material exiting from said outlet means.

16. A method as defined in claim 15 in which said modifying step includes the step of attempting to increase the heat supplied to said furnace in response to an increasing temperature of said molten material in said outlet means.

17. A method as defined in claim 15 in which said modifying step includes the step of attempting to decrease the heat supplied to said furnace in response to a decreasing temperature of said molten material in said outlet means.

18. A method as defined in claim 15 which includes the further step of inhibiting said modifying step unless the rate of change of said temperature of said molten material in said outlet means falls within predetermined limits.

19. Glass melting and processing apparatus comprising a melting tank having batch inlet means and molten glass outlet means, burner means for melting batch fed in said inlet means, means for regulating fuel flow to said burner means to maintain a predetermined temperature in said tank, means responsive to the temperature of molten glass exiting from said outlet means for modifying the effect of said fuel flow regulating means in accordance with the output of molten glass from said tank.

20. A method of controlling a furnace comprising the steps of supplying batch material through an inlet of said furnace, heating said batch material to a molten state in said furnace, flowing said molten material through an outlet means of said furnace in response to use requirements, sensing the temperature in said furnace, regulating the heat supplied in said furnace in response to the temperature sensed in said furnace, measuring material flow through said furnace by sensing the temperature of said molten material exiting from said outlet means, and anticipating the heat requirements of said furnace by modifying the effect of said furnace temperature sensing on the regulation of heat supplied to said furnace in response to temperature changes sensed in said molten material exiting from said outlet means.

References Cited
UNITED STATES PATENTS 2,153,922    4/1939    Green et al. _____ 236—15
3,010,657    11/1961    Post _____ 236—15

JOHN J. CAMBY, *Primary Examiner.*

U.S. Cl. X.R.

65—162; 236—15